(12) United States Patent
Rollins et al.

(10) Patent No.: US 7,442,917 B1
(45) Date of Patent: Oct. 28, 2008

(54) METHOD FOR USING A SINGLE OPTICAL EMITTER/RECEIVER PAIR FOR CREATING A LIGHT CURTAIN USING LCD+MEMS TECHNOLOGY FOR BEAM DEFLECTION

(75) Inventors: George E. Rollins, Chelmsford, MA (US); James E. Dogul, Hudson, NH (US); Richard Galera, Nashua, NH (US); Derek W. Jones, Kirkcudbright (GB); George Schuster, Royal Oak, MI (US); Suresh Nair, Amherst, NH (US); Ray Delcher, Oxnard, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/360,081

(22) Filed: Feb. 23, 2006

(51) Int. Cl.
  *H01J 40/14* (2006.01)
(52) U.S. Cl. .................. 250/222.1; 250/221; 340/556
(58) Field of Classification Search .......... 250/221, 250/222.1, 234, 201.9; 349/201, 202; 340/555, 340/556, 557; 359/350, 351, 850, 855, 856, 359/857, 860, 861, 862
See application file for complete search history.

(56) References Cited

U.S. PATENT DOCUMENTS

| 4,384,280 | A | * | 5/1983 | Haag ........................ 340/556 |
| 4,875,761 | A | | 10/1989 | Fetzer |
| 5,255,073 | A | | 10/1993 | Wallin et al. |
| 6,354,716 | B1 | | 3/2002 | Chen et al. |
| 6,577,376 | B1 | * | 6/2003 | Shih ........................ 349/202 |
| 6,750,439 | B2 | | 6/2004 | Nakazaki et al. |
| 2002/0054422 | A1 | * | 5/2002 | Carr et al. ................ 359/291 |

* cited by examiner

*Primary Examiner*—Georgia Y. Epps
*Assistant Examiner*—Francis M Legasse, Jr.
(74) *Attorney, Agent, or Firm*—Amin Turocy & Calvin LLP; William R. Walbrun

(57) ABSTRACT

Systems and methods are disclosed that facilitate increasing a coverage area for an emitter-receiver pair in a light curtain by generating multiple light beams from a single emitter and aggregating the light beams at a corresponding receiver. A plurality of light beams can be generated by reflection off of a MEMS mirror associated with the emitter, which can then be reflected from receiver-side mirrors along generally parallel paths, to corresponding emitter-side mirrors, which in turn reflect the light beams back to a MEMS mirror associated with the receiver. The receiver-side MEMS mirror can aggregate the reflected light beams for detection thereof by the receiver. According to a related aspect, transmissive LCD arrays can be employed at both the emitter and receiver to generate and recombine a plurality of light beams, respectively.

17 Claims, 9 Drawing Sheets

METHOD FOR USING A SINGLE OPTICAL EMITTER/RECEIVER PAIR FOR CREATING A LIGHT CURTAIN USING LCD+MEMS TECHNOLOGY FOR BEAM DEFLECTION

TECHNICAL FIELD

The subject invention relates generally to industrial safety systems and, more particularly, to light curtain efficiency.

BACKGROUND

In many industrial environments, manufacturing processes have become automated and industrial efficiency has risen substantially in recent years. While efficiency is important in generating a product and meeting consumer demand, safety is also an important aspect of industrial design. Many safety features have been implemented in attempts to minimize injury to operators and/or other personnel in an industrial environment, such as a factory or manufacturing plant. For instance, emergency shut-off systems can be brightly colored and positioned at points of easy access to permit an operator to shut down a dangerous machine in the event of an accident. However, such systems are typically only employed when it is too late, such as after an accident.

Other safety devices are designed to facilitate providing a safe manufacturing environment are directed toward shutting down hazardous movement or conditions before an accident happens. For instance, one such safety device is a safety light curtain that can be utilized to prevent injury by detecting an interruption of one or more light beams comprising the light curtain. In this manner, object detection can be achieved based on interrupted light beams, and can be performed at varying levels of sensitivity. For instance, light beams can be designed and/or set to detect an object the size of a finger, a hand, a limb, etc., depending on a particular application associated with the device from which the light curtain is intended to protect a human operator. Typical light curtains comprise a plurality of emitters and receivers, where each respective emitter-receiver pair must be critically aligned in order to ensure proper operation. For instance, an emitter and receiver must be aligned to ensure that emitted light is received by a corresponding receiver when there is no obstruction in the path of the light beam. If the emitter and receiver fall out of alignment, a false alarm condition can be generated (e.g., the light curtain will register an obstruction because the expected light beam is not received at the receiver.

Conventional light curtain systems that employ numerous emitter-receiver pairs can thus be costly to maintain with regard to both time and money. Ensuring that each and every emitter-receiver pair in the light curtain is critically aligned can require substantial time investment, resulting in increased machine down-time during maintenance and reduced productivity. Thus, there is a need in the art for systems and/or methods that overcome such deficiencies.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

According to various aspects, systems and methods are disclosed that facilitate generating a plurality of light beams for transmission across a monitored area between a single emitter and receiver. For example, emitted light, such as infrared light, can be split into multiple beams that can be transmitted across the monitored area, reflected back (e.g., in a substantially parallel fashion), and reflected yet again across the monitored area to a receiver that detects the multiple beams concurrently.

According to one aspect, a system that facilitates generating a light curtain with a single emitter-receiver pair can comprise an emitter that emits light that can be redirected to a plurality of receiver-side mirrors, A through A+n, which in turn can reflect the light back along substantially parallel paths A through A+n to corresponding emitter-side mirrors A through A+n, which in turn reflect the light yet again across the monitored space to a receiver. According to some aspects, emitted light can be parsed into multiple beams by a MEMS mirror, which rotatable to reflect the emitted light sequentially to the plurality of receiver-side mirrors. A second MEMS mirror can be employed to reflect beams received from the emitter-side mirrors into the receiver. According to a related aspect, the MEMS mirror can be stationary and the emitter can emit light at sufficient intensity to provide beams of adequate strength when separated by the MEMS mirror. Additionally or alternatively, a transmissive LCD array can be employed and transmissive apertures can be selectively generated thereon to define a deflection angle for the A through A+n receiver side mirrors, thereby parsing the emitted light into a plurality of respective beams that can be transmitted and/or reflected as described herein. A second transmissive LCD array can be utilized at the receiver to similarly deflect reflected beams into the receiver.

According to another aspect, a method of generating a light curtain using a single emitter-receiver pair can comprise generating a plurality of light beams from a single light source, transmitting the light beams to respective receiver-side mirrors, reflecting the respective beams to corresponding emitter-side mirrors in a generally parallel fashion, and finally reflecting the beams back to a receiver. Generation of the plurality of light beams can comprise employing a MEMS mirror to scan or reflect the emitted light to each of a plurality of receiver-side mirrors. Additionally or alternatively, the light beams can be generated using a transmissive LCD array that defines a deflection angle such that as transmissive apertures on the LCD array are altered, emitted light passing there through is deflected to a different receiver-side mirror. In this manner, a plurality of receiver-side mirrors and emitter-side mirrors can be utilized to effectively replace costly emitters and receivers that would be required if employing a conventional light curtain.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
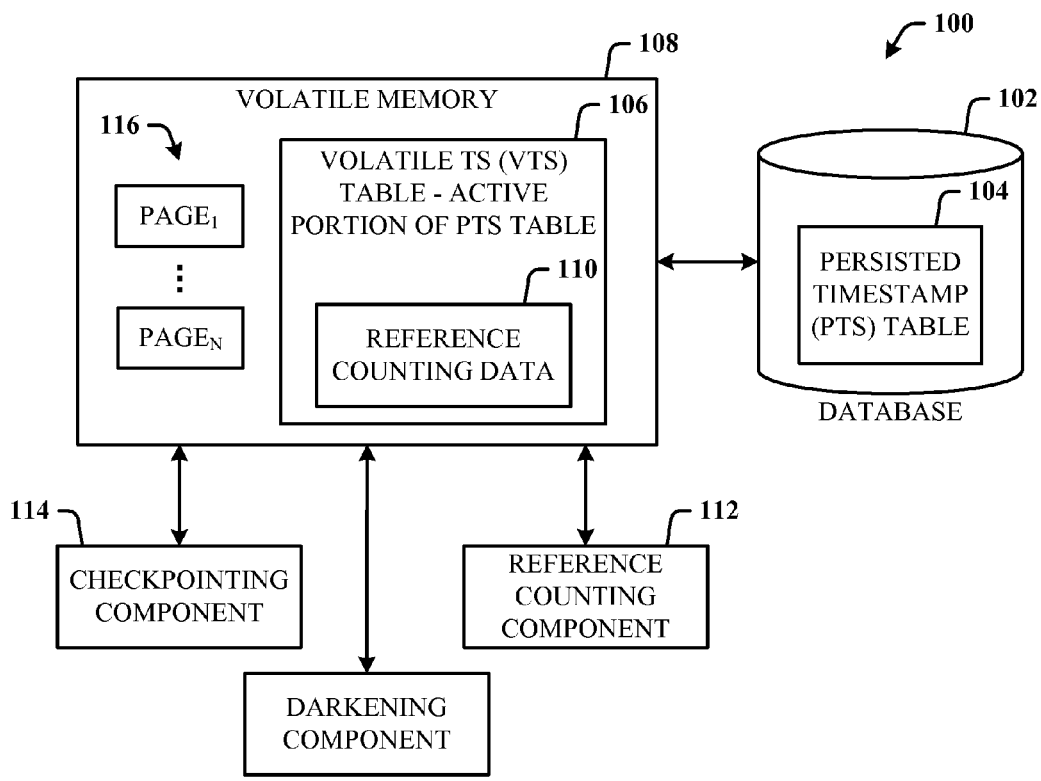
FIG. 1 illustrates a system that facilitates minimizing a number of emitter-receiver pairs in a light curtain or similar device by employing a plurality of micro-electromechanical system (MEMS) mirrors to direct light from a single emitter along a plurality of paths to a single receiver, in accordance with one or more aspects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a system 100 that facilitates minimizing a number of emitter-receiver pairs in a light curtain or similar device by employing a plurality of micro-electromechanical system (MEMS) mirrors to direct light from a single emitter along a plurality of paths to a single receiver, in accordance with one or more aspects. The system 100 comprises an emitter 102 at a first side of an area to be monitored by the light curtain, which emits light (e.g., infrared, laser, . . . ) that is reflected by a first MEMS mirror 104 on the emitter side of the monitored area. It will be understood that "MEMS," as used herein, can comprise micro-opto-electromechanical systems (MOEMS) as well. The MEMS mirror can be rotatable to sequentially reflect emitted light to in multiple directions. Light is reflected by the MEMS mirror 104 to a plurality of mirrors 106 on a receiver side of the monitored area. Mirrors 106 can be fixed mirrors, MEMS mirrors, or any other suitable type of mirror, as will be appreciated by those skilled in the art.

Each mirror 106 can reflect and/or direct its associated incident light beam along a respective path A through A+n, where A+n represents a total number of mirror pairs and associated light paths to be generated to form the light curtain or a portion thereof. Each path A through A+n can terminate at a respective emitter-side mirror 108, which can be a fixed mirror, a MEMS mirror, or any other suitable type of mirror. The incident beam to the emitter-side mirror can be reflected and/or directed to a receiver-side MEMS mirror 110, such that all paths A through A+n are reflected by their associated emitter-side mirrors 108 into the same receiver-side MEMS mirror 110. The receiver-side MEMS mirror 110 then reflects the aggregate light beam into a receiver 112. In this manner, a single emitter/receiver pair can be employed to generate a plurality of beam paths to increase coverage of a monitored area by the single emitter-receiver pair. This in turn permits fewer emitters and receivers to be utilized when monitoring an area of a given size, which can reduce costs and minimize down-time required for emitter-receiver alignment and the like.

Figure 2:
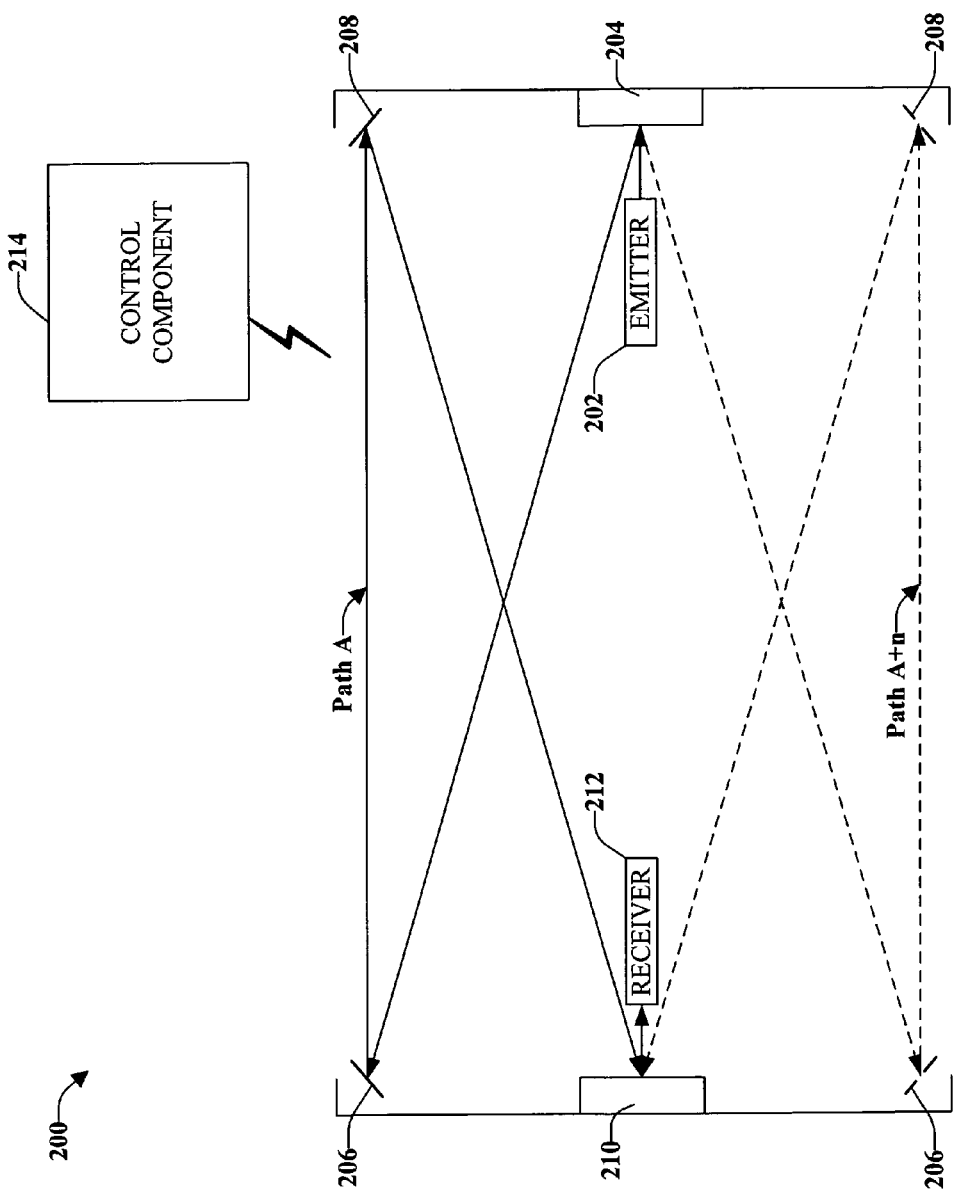
FIG. 2 illustrates a system that facilitates maximizing coverage area for a single emitter-receiver pair in a light curtain or similar device by employing a plurality of MEMS mirrors to generate a plurality of light beams between the single emitter-receiver pair, in accordance with one or more aspects.

FIG. 2 illustrates a system 200 that facilitates maximizing coverage area for a single emitter-receiver pair in a light curtain or similar device by employing a plurality of MEMS mirrors to generate a plurality of light beams between the single emitter-receiver pair, in accordance with one or more aspects. The system 200 comprises an emitter 202 at a first side of an area to be monitored by the light curtain, which emits light (e.g., infrared, laser, . . . ) that is reflected by a first MEMS mirror 204 on the emitter side of the monitored area. Light reflected by the MEMS mirror 204 is directed to a plurality of receiver-side mirrors 206 on a receiver side of the monitored area, which can be fixed mirrors, MEMS mirrors, or any other suitable type of mirror, as will be appreciated by those skilled in the art. Each mirror 206 reflects its associated incident light beam along a respective path A through A+n, where A+n represents a total number of mirror pairs and associated light paths to be generated to form the light curtain or a portion thereof. Each path A through A+n can terminate at a respective emitter-side mirror 208, which can be a fixed mirror, a MEMS mirror, or any other suitable type of mirror. All light beams, along paths A through A+n, can be reflected by their associated emitter-side mirrors 208 into a receiver-side MEMS mirror 210. The receiver-side MEMS mirror 210 then reflects the aggregate light beam into a receiver 212.

The system 200 further comprises a control component 214 that is operatively coupled to each of the emitter 202 and the receiver 212. Although the control component 214 is illustrated as a separate component from the emitter 202 and receiver 212, such is the case for purposes of illustration only (e.g., to minimize a number of intersecting and/or overlapping lines in the figure) and to permit ease of understanding. The control component 214 can receive information related to light received at the receiver 212 (e.g., intensity, phase, angle, . . . ) and can perform analyses and/or comparison protocols to evaluate whether an impediment is present in the monitored area. For instance, the control component 214 can receive information from the emitter 202 related to an intensity associated with emitted light, which can be compared to the received light intensity to determine whether the monitored area is free of obstruction. In the event that the received light exhibits an intensity less than some predetermined threshold, a determination can be made that an object is present in the monitored area and a machine or device being govern by the light curtain can be shut down to prevent injury to, for instance, an operator. Thus, the system 200 can employ various control mechanisms to provide a safer operating environment while reducing a number of emitter-receiver pairs required to monitor the environment, thereby reducing costs associated with, for example, generating a light curtain, aligning the light curtain, machine duty cycle, and the like.

Figure 3:
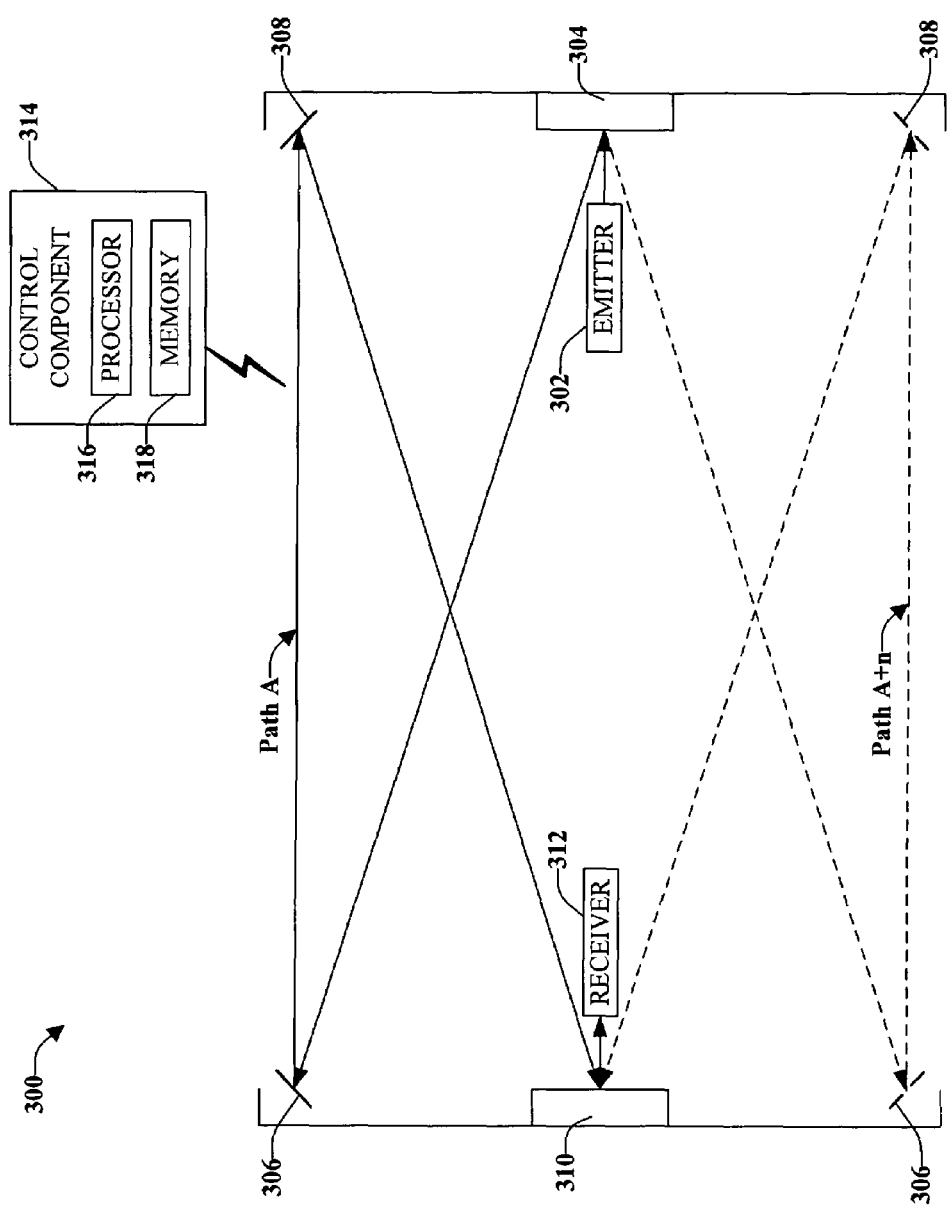
FIG. 3 illustrates a system that facilitates generating a plurality of light beams between a single emitter-receiver pair in a light curtain or similar device by employing a plurality of MEMS mirrors, in accordance with one or more aspects.

FIG. 3 illustrates a system 300 that facilitates generating a plurality of light beams between a single emitter-receiver pair in a light curtain or similar device by employing a plurality of MEMS mirrors, in accordance with one or more aspects. The system 300 comprises an emitter 302 an emitter side of a monitored, which emits light (e.g., infrared, laser, . . . ) that is reflected by a first MEMS mirror 304 on the emitter side of the monitored area. The MEMS mirror 304 reflects the emitted light to a plurality of receiver-side mirrors 306, which can be fixed mirrors, MEMS mirrors, or any other suitable type of mirror, as will be understood by those skilled in the art. Each receiver-side mirror 306 reflects its incident light beam along a respective path A through A+n, where A+n represents a total number light paths to be generated to form the light curtain or a portion thereof. Each path A through A+n can further be reflected by a respective emitter-side mirror 308, which can also be a fixed mirror, a MEMS mirror, or any other suitable type of mirror. All light beams, along paths A through A+n, can be reflected by their associated emitter-side mirrors 208 into a receiver-side MEMS mirror 310. The receiver-side MEMS mirror 210 then reflects the aggregate light beam into a receiver 312.

A control component 314 can be operatively coupled to each of the emitter 302 and the receiver 312. It is to be understood that the control component 314 is operatively coupled (e.g., by one or more wires, by a wireless connection, . . . ) to one or both of the emitter 302 and the receiver 312, despite a lack of illustration of such connections. The control component 314 can receive information related to light received at the receiver 312 (e.g., intensity, phase, angle, . . . ) and can analyze such information to determine whether a fault condition exists (e.g., whether there is an obstruction in the monitored area).

In order to facilitate analyzing such information, the control component 314 can comprise a processor 316 and a memory 318, each of which can be operatively coupled to the other. The processor 316 can be a processor dedicated to analyzing information associated with the receiver 312, the emitter 302, and/or memory 318, a processor that facilitates determining whether a fault condition exists, a processor used to control one or more of the components of the system 300, or, alternatively, a processor that is both used to analyze information and evaluate fault conditions, as well as to control one or more of the components of the system 300. The memory component 318 can be employed to retain information associated with light beam alignment, mirror alignment, light beam intensity, corrective action, and/or any other information related to the system 300.

Furthermore, the memory 318 can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory of the present systems and methods is intended to comprise, without being limited to, these and any other suitable types of memory.

Figure 4:
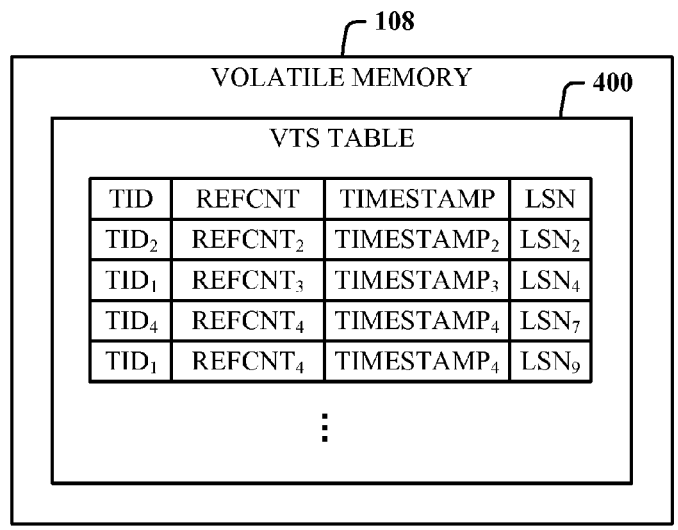
FIG. 4 is an illustration of a system that facilitates increasing a coverage area for a single emitter-receiver pair in a device, such as a light curtain, in accordance with various aspects described herein.

FIG. 4 is an illustration of a system 400 that facilitates increasing a coverage area for a single emitter-receiver pair in a device, such as a light curtain, in accordance with various aspects described herein. The system 400 can comprise, for example, an emitter 402 that emits light (e.g., infrared, laser, . . . ). A transmissive LCD array 404 can be positioned in front of the emitter 402, upon which transmissive apertures can be generated to deflect emitted light onto a plurality of receiver-side mirrors 406. For example, the LCD 404 can be completely darkened (e.g., made opaque) except for a series of selectively positioned slits that are not darkened in order to permit light to pass through the LCD. These sets of transmissive apertures can be positioned to direct light to each of a plurality of receiver-side mirrors 406, such that each set of transmissive apertures directs light to a specific receiver-side mirror 406. Receiver-side mirrors 406 can be MEMS mirrors, fixed mirrors, or any other suitable type of mirrors, as will be appreciated by those skilled in the art.

The directed light, incident on the receiver-side mirrors, can be reflected back to a plurality of respective emitter-side mirrors 408 along light paths A through A+n, where A and n are integers. The emitter-side mirrors can be, for example, fixed mirrors, MEMS mirrors, or any other suitable mirror, and can reflect respective light beams back across the monitored area to a second transmissive LCD array 410 positioned in front of a receiver 412. The second LCD 410 functions substantially in a reverse manner to the LCD 404 in that a plurality of sets of transmissive apertures are generated on the LCD 410 to redirect light from multiple points to a single point (e.g., the receiver 412). In general, the second LCD 410 otherwise functions identically to the LCD 404 in that the entire LCD is darkened except at lines where the transmissive apertures are desired to permit light to pass through the LCD 410. Thus, by providing the light-directing LCDs 404 and 410 can facilitate redirecting emitted light to a plurality of mirrors for transmission over multiple paths to increase coverage area for the emitter, before being reflected back to a receiver on an opposite side of the monitored area.

Figure 5:
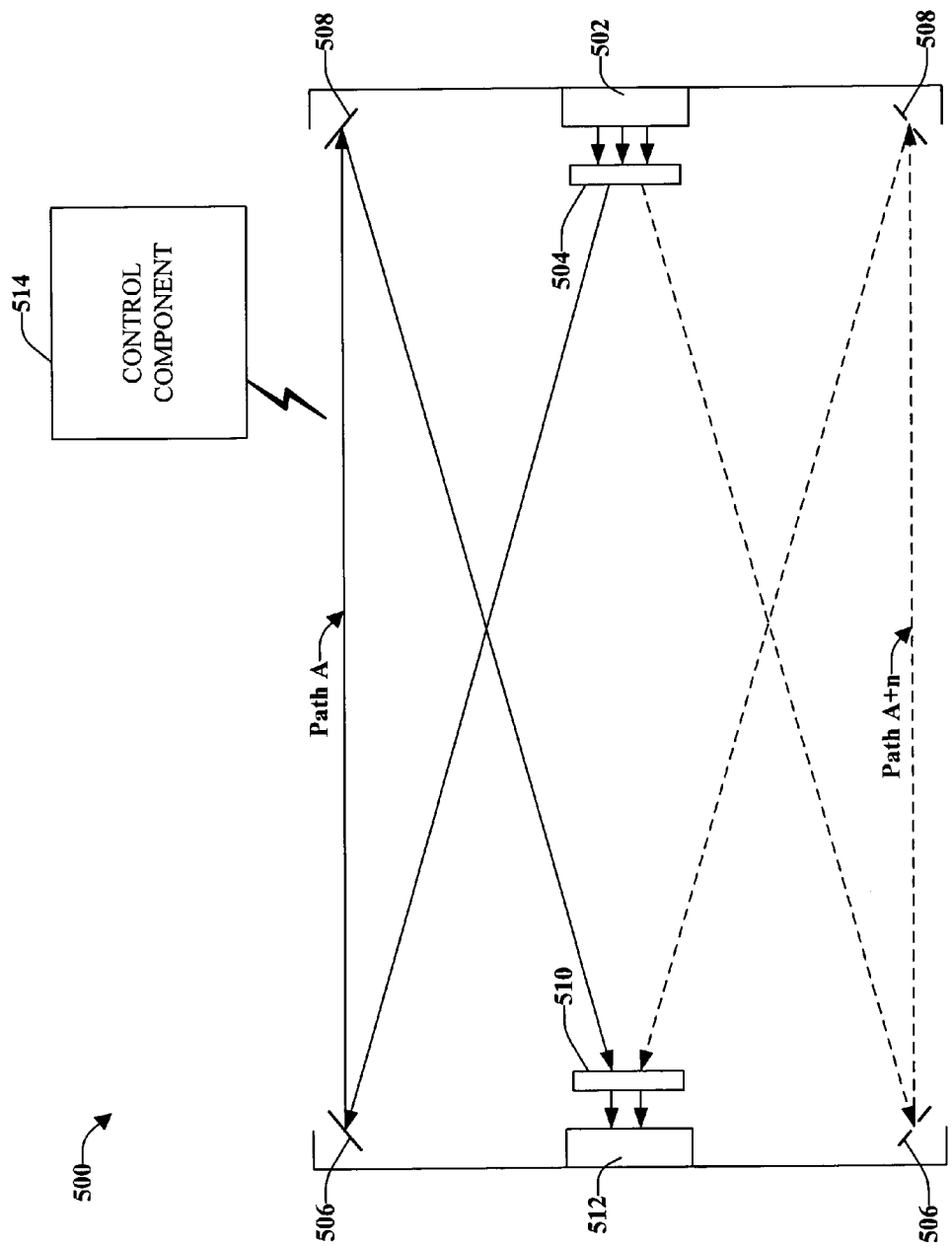
FIG. 5 illustrates a system that facilitates increasing a coverage area of a single emitter-receiver pair in a device such as a light curtain, in accordance with one or more aspects.

FIG. 5 illustrates a system 500 that facilitates increasing a coverage area of a single emitter-receiver pair in a device such as a light curtain, in accordance with one or more aspects. They system 500 can comprise a light source or emitter 502 that provides light (e.g., infrared, laser, ultraviolet, . . . ) on a first side of a monitored area. Emitted light can be passed through selectively generated transmissive apertures on a transmissive LCD array 504 positioned in front of the emitter 502, which directs light to a plurality of receiver-side mirrors 506. The receiver-side mirrors can be, for instance, MEMS mirrors, fixed mirrors, or any other suitable type of mirrors, as will be appreciated by those skilled in the art. The directed light, incident on the receiver-side mirrors 506, can be reflected back to a plurality of respective emitter-side mirrors 508 along light paths A through A+n, where A and n are integers. The emitter-side mirrors 508, like the receiver-side mirrors, fixed mirrors, MEMS mirrors, or any other suitable mirror, and can reflect respective light beams back across the monitored area to a second transmissive LCD array 510 positioned in front of a receiver 512, in a manner similar to that described above with regard to FIG. 4.

The system 500 can additionally comprise a control component 514, which is operatively coupled to the emitter 502, the receiver 512, and the LCDs 504 and 510. The control component 514 can receive information from the various components to permit analysis thereof and to provide feedback to ensure proper system function. For example, during a test phase, the control component 514 can have knowledge that the monitored area is free of obstruction. Based on a measured or pre-known intensity associated with emitted light from the emitter 502, the control component 514 can receive information related to an intensity associated with received light detected at the receiver 512, and can perform analysis there on and/or comparisons there between. In the event that the received light exhibits an intensity less than a predicted or expected intensity, which can be based in part on the intensity of the emitted light, the control component 514 can provide a signal or alert that the system requires maintenance (e.g., cleaning of one or more of the mirrors 506 and 508 and/or the LCDs 504 and 510, realignment of one or more components of the system, . . . ).

Additionally, the control component 514 can compare aggregate light received at the receiver 512 to a predetermined threshold value to determine whether there is an obstruction in the monitored area during operation. For instance, received light having an intensity of 95% that of emitted light can be acceptable, while received light at 70% intensity can warrant a shut-down of a machine or device associated with the light curtain in which system 500 is employed. According to another aspect, where light is received at less-than-expected intensity, the control component 514 can provide feedback to one or both LCDs 504 and 510 to generate larger transmissive apertures thereon (e.g., to permit more light to pass through) in order to maintain system operation until, for instance, maintenance such as cleaning can be performed on the system. In this manner, the system 500 can facilitate improving area coverage for a single emitter-receiver pair while mitigating unnecessary shut-downs (e.g., such as false reads of an obstruction) that can cost time and money in a factory environment.

Figure 6:
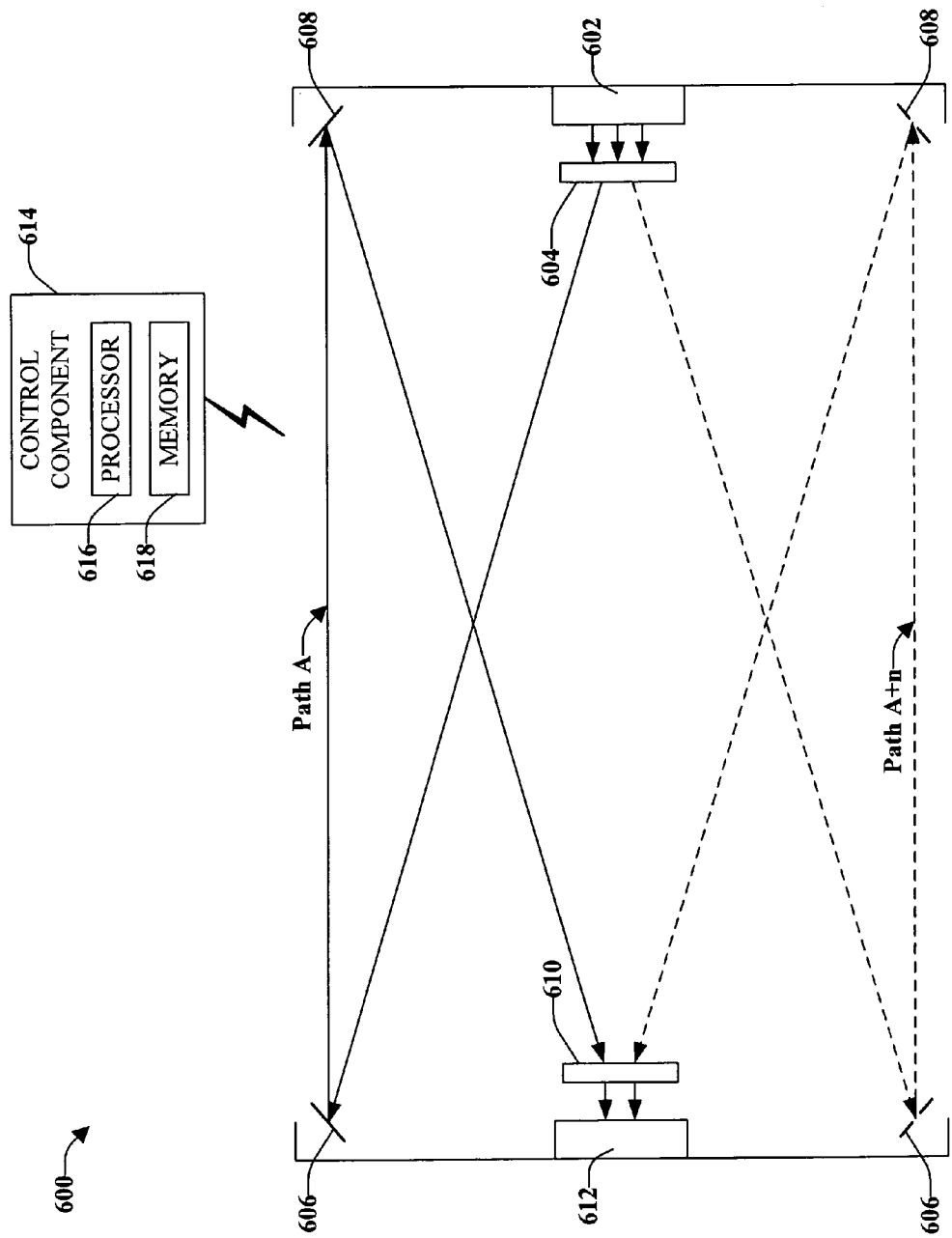
FIG. 6 is an illustration of a system that facilitates reducing a number of emitter-receiver pairs in a light curtain or similar device by employing selectively transmissive LCDs to redirect emitted light, in accordance with one or more aspects herein.

FIG. 6 is an illustration of a system 600 that facilitates reducing a number of emitter-receiver pairs in a light curtain or similar device by employing selectively transmissive LCDs to redirect emitted light, in accordance with one or more aspects herein. The system 600 can comprise an emitter 602 that generates light, such as infrared, laser, etc., and a transmissive LCD array 604 positioned in front of the emitter 602. Transmissive apertures can be generated on the LCD, for example, by darkening the LCD except at positions where light is to be passed. For instance, a series of transmissive apertures can be formed as a plurality of slits through which emitted light is passed and directed to a receiver-side mirror 606, and each of a plurality of receiver-side mirrors 606 can have an associated set of transmissive apertures that directs light to the specific receiver-side mirror 606.

The receiver-side mirrors 606 can reflect light back across a monitored area to respective emitter-side mirrors 608, over respective light beam paths A through A+n, where A and n are integers, as indicated in FIG. 6. It will be appreciated that the mirrors 606 and 608 can be fixed mirrors, MEMS mirrors, or any other suitable type of mirror for directing/reflecting light across the monitored space as described herein. The emitter-side mirrors 608 can then reflect light received along paths A through A+n back to a receiver-side LCD 610 that is positioned in front of a receiver 612. The receiver-side LCD 610 can be darkened except where light is to be passed to generate transmissive apertures that let light from the emitter-side mirrors 608 traverse the LCD 610, and which direct the light onto the receiver 612. In this manner, a single emitter-receiver pair can generate a plurality of light beam paths to maximize coverage of a monitored area.

A control component 614 can be operatively coupled to each of the emitter 602 and the receiver 612, as well as to the LCDs 604 and 610. The control component 614 can receive information related to light received at the receiver 612 (e.g., intensity, phase, angle, . . . ) and can analyze such information to determine whether a fault condition exists (e.g., whether there is an obstruction in the monitored area, whether the system 600 requires maintenance, cleaning, alignment, . . . ). In order to facilitate analyzing such information, the control component 614 can comprise a processor 616 and a memory 618, each of which can be operatively coupled to the other. The processor 316 can be a processor dedicated to analyzing information associated with the receiver 612, the emitter 602, LCDs 604 and 610, and/or memory 618, a processor that facilitates determining whether a fault condition exists, a processor used to control one or more of the components of the system 600, or, alternatively, a processor that is both used to analyze information and evaluate fault conditions, as well as to control one or more of the components of the system 600. The memory component 618 can be employed to retain information associated with transmissive aperture generation, light beam alignment, mirror alignment, light beam intensity, corrective action, and/or any other information related to the system 600. Furthermore, the memory 618 can be either volatile memory or nonvolatile memory, or can include both volatile and nonvolatile memory, such as the memory types described above with regard to FIG. 3.

It will be appreciated that the configurations of the emitters and receivers in the various above-described figures are exemplary in nature only, and that the various aspects described herein are not limited to emitters and receivers that are substantially opposite each other. Rather, according to other aspects, an emitter-receiver pair can be placed in a vertical stack, both facing a same direction. In such a scenario, the plurality of mirrors used to reflect light beams to one or more other mirrors or back to the receiver can be oriented in such a manner as to ensure that the light beams derived from the emitted light are reflected back to the receiver. For example the mirror employed can be positioned in any orientation that produces multiple light beam paths, and need not be viewed as "emitter-side" or "receiver-side" mirrors, etc.

Additionally or alternatively, a receiver may be positioned at approximately 90 degrees orientation to the emitter, and the respective mirrors and/or LCDs described above can be adjusted to ensure that emitted light is received at the receiver. As will be appreciated by those skilled in the art, the orientation of emitter and receiver can be any suitable orientation, and can be facilitated by employing any suitable number of mirrors in respective positions to generate the described light curtains or portions thereof. In this manner, light curtains can be generated in or about areas where mounting a receiver or an emitter is difficult or infeasible, thereby increasing worker safety and/or decreasing machine malfunction.

Figure 7:
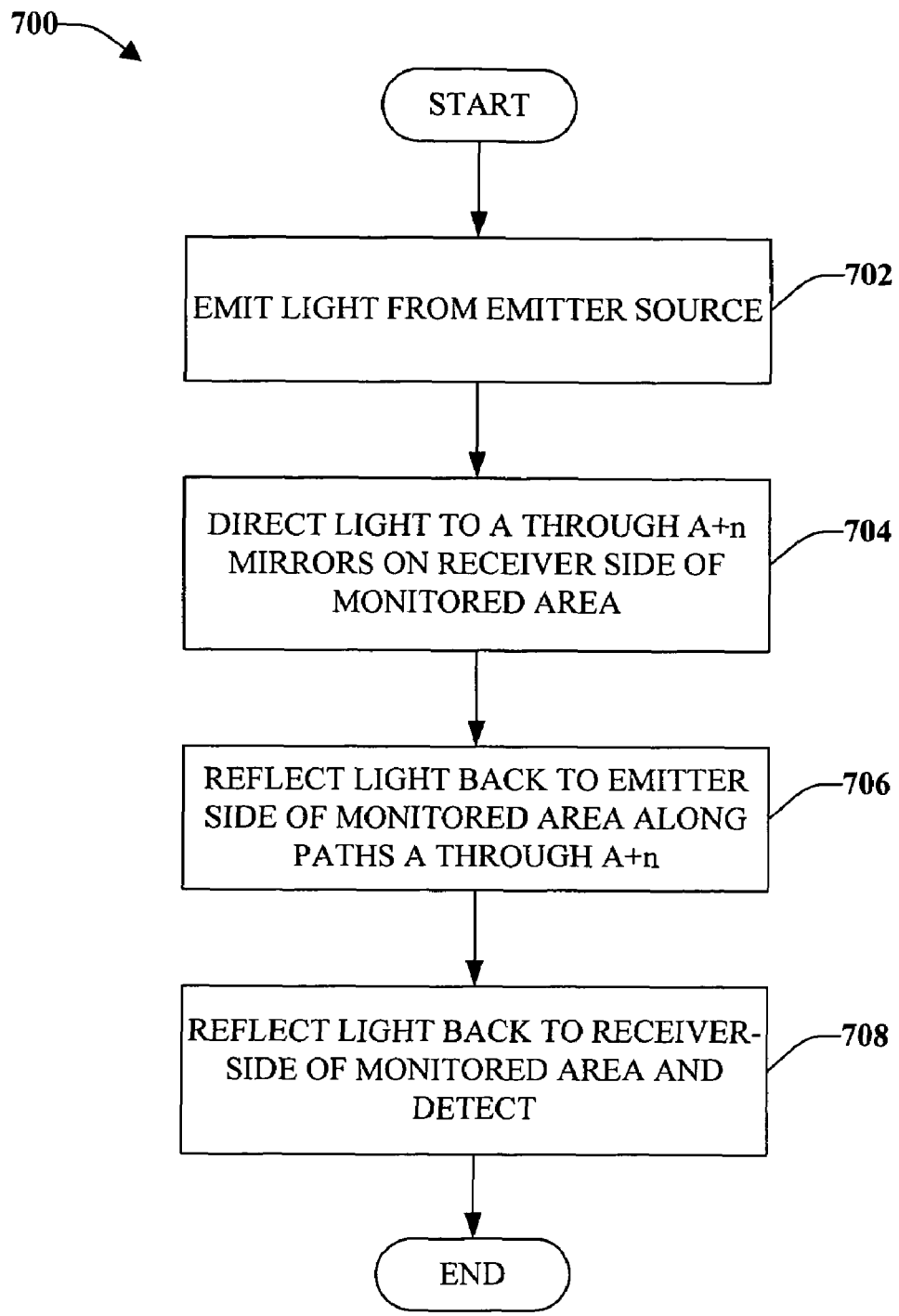
FIG. 7 illustrates a methodology for generating a plurality of light beam paths between a single emitter and receiver in a device such as a light curtain to increase coverage of a monitored area.
Figure 8:
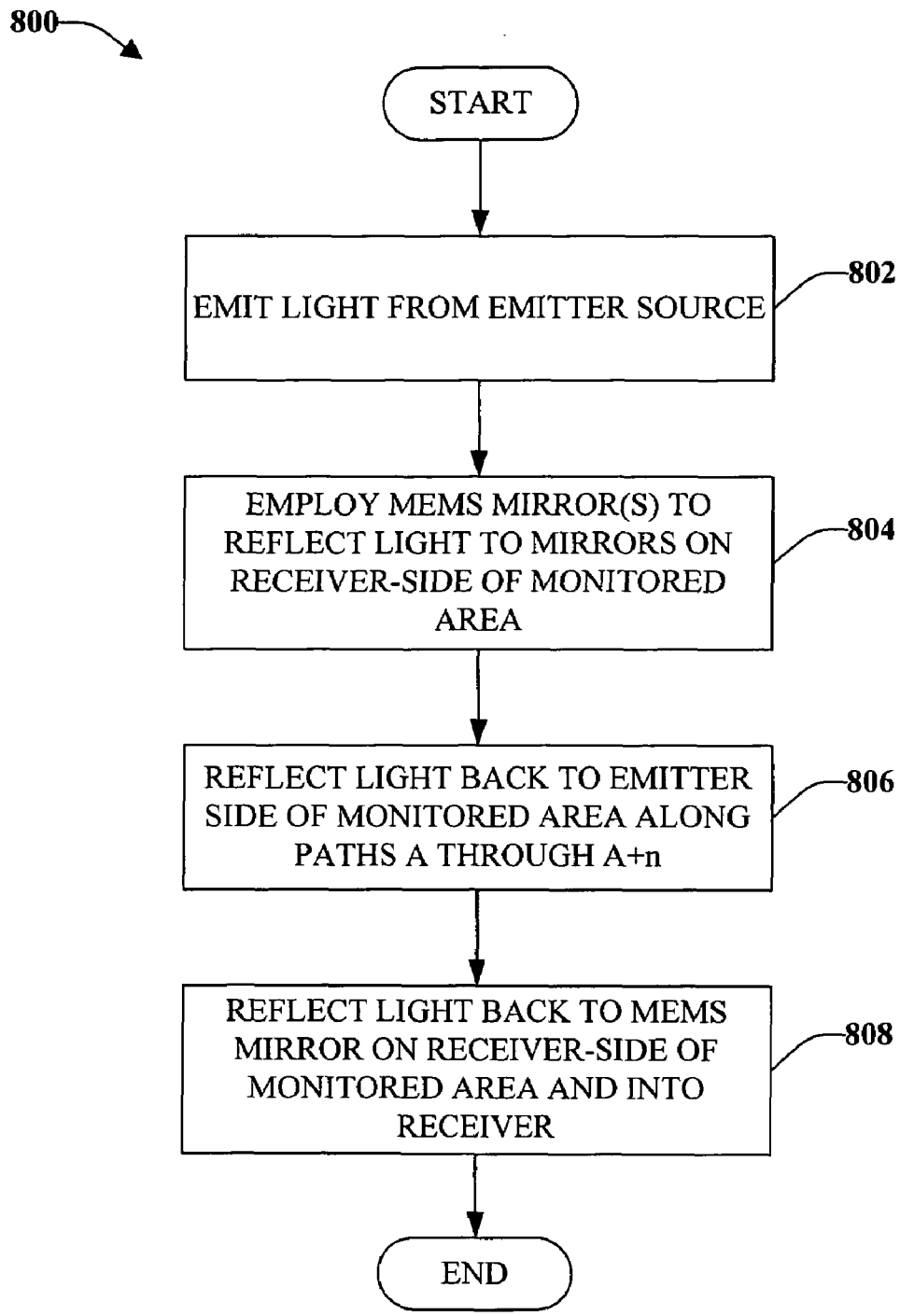
FIG. 8 is an illustration of a methodology for increasing light curtain efficiency by minimizing a number of emitter-receiver pairs required to cover a given monitored space, in accordance with various aspects presented herein.
Figure 9:
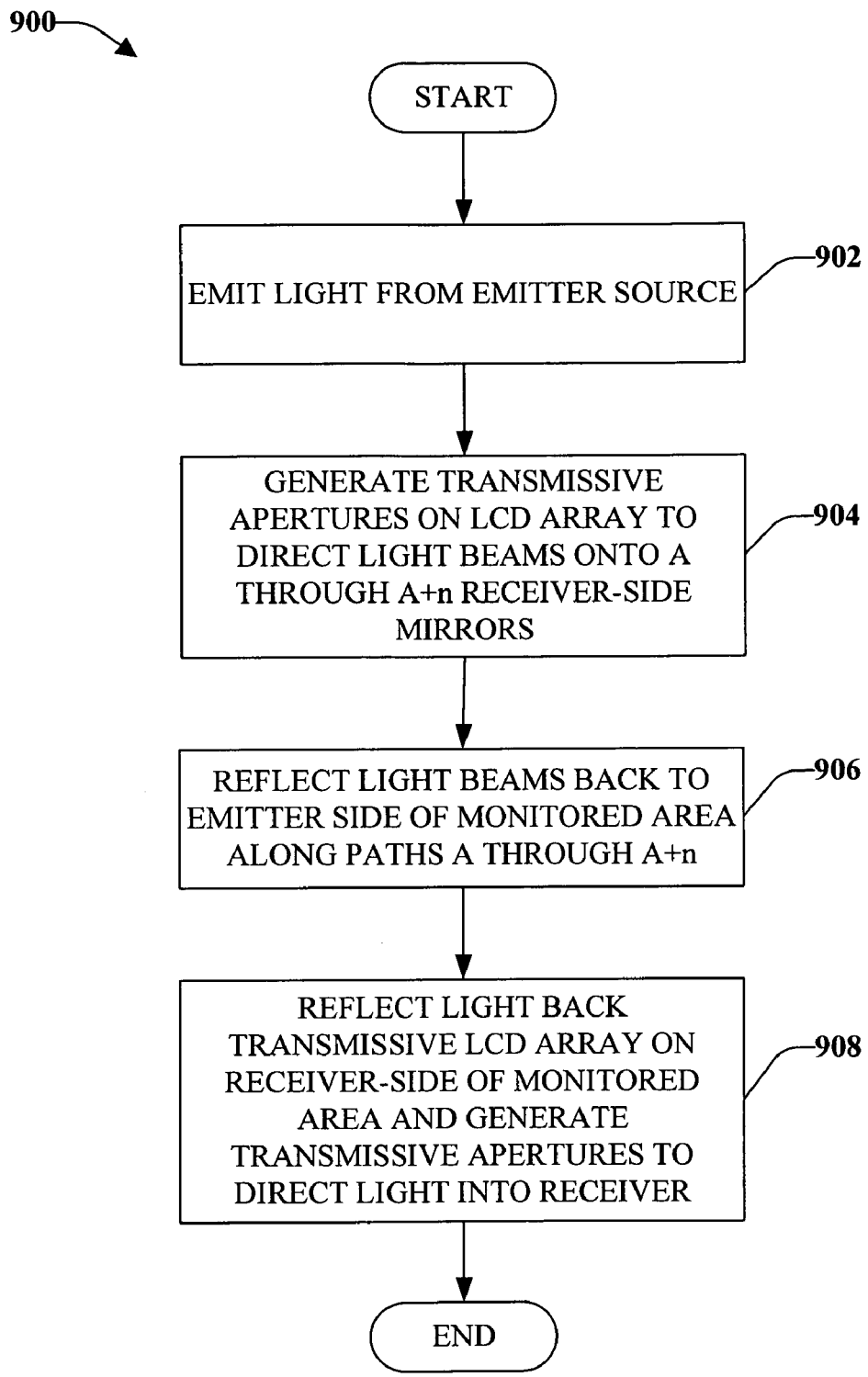
FIG. 9 illustrates a methodology for increasing coverage of a monitored area using a single emitter-receiver pair to generate multiple monitoring light beams, in accordance with various aspects.

Referring to FIGS. 7-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a methodology 700 for generating a plurality of light beam paths between a single emitter and receiver in a device such as a light curtain to increase coverage of a monitored area. At 702, a light source can emit light, such as infrared light, ultraviolet light, laser light, white light, or the like, for transmission across a monitored area. At 704, the emitted light can be directed to one or more mirrors, A through A+n, at another side of the monitored area, which may be the receiver-side of the monitored area but is not limited to being so. The A through A+n mirror can be, for instance, fixed mirrors, MEMS mirrors, rotating mirrors, or any other suitable type of mirrors, and can reflect respective incident light beams to one or more corresponding mirrors on yet another side of the monitored area, which may be the emitter side of the monitored area but is not limited to being so, at 706. The reflected light can travel along a number of corresponding paths between respective mirror sets, A through A+n, in order to increase a number of light beams traversing the monitored area. This aspect can improve coverage in a monitored area of given size. Additionally or alternatively, this aspect can be utilized to increase the area being monitored by a single emitter-receiver pair.

At 708, the mirrors at the ends of light paths A through A+n can reflect light back to a receiver for detection and a determination of whether an object is present in the monitored area. For instance, light curtains can be designed with variable levels of granularity and/or scalability, to detect objects of varying sizes. According to an example, a light curtain may be designed and/or preset to provide an emergency shut-down of an associated machine upon a determination that an object the size of a finger, a hand, an arm, etc., is present in the monitored area. In such as case, the light curtain is typically employed to prevent injury to a human operator of the machine associated with the light curtain. According to another example, the light curtain may be employed to verify that a particular monitored area is free of debris that could detrimentally affect the operation of an associated device. In either case, the method 700 can be employed to facilitate reducing costs associated with device operation by increasing a coverage area for each emitter-receiver pair in the light curtain, which is achieved by increasing a number of light beams between each emitter-receiver pair.

FIG. 8 is an illustration of a methodology 800 for increasing light curtain efficiency by minimizing a number of emitter-receiver pairs required to cover a given monitored space, in accordance with various aspects presented herein. At 802, light can be emitted from a light source. The light can be, according to one or more aspects, infrared light, laser light, or any other suitable type of light for monitoring a space. At 804, the emitted light can be reflected by a MEMS mirror, such that the emitted light is incident to the MEMS mirror and is reflected across the monitored space as one or more distinct light beams to one or more mirrors on an opposite side of the monitored space, which can be MEMS mirrors, fixed mirrors, etc. At 806, the mirrors on the opposite side of the monitored space can reflect respective incident beams back across the monitored space to corresponding mirrors on the first side of the monitored space, where each light beam traverses a unique path, A through A+n, across the monitored space.

According to an example, a first light beam generated by reflection off of the emitter-side MEMS mirror can be reflected to a receiver-side mirror, A; a second beam from the emitter-side MEMS mirror can be reflected to a second receiver-side mirror, A+1, and so on through a mirror A+n. Receiver-side mirrors can then reflect their respective beams back across the monitored space to corresponding emitter-side mirrors along paths A through A+N. It will be appreciated that paths A through A+N can be substantially parallel to each other if desired, or may comprise other configurations in order to effectively cover the monitored space according to a particular application or design.

One the beams have traversed respective paths A through A+n, they emitter-side mirrors can reflect their respective beams back across the monitored space to converge on a receiver-side MEMS mirror, which in turn reflects an aggregate of the light beams into a receiver, or detector. Once the aggregate of the transmitted light has been detected or received, it can be compared to a threshold value to permit a determination of whether the monitored area is free of impediments or whether an object is present that warrants an emergency shut-down of a device associated with the light curtain. In this manner, a single emitter-receiver pair can be utilized to cover a larger space than can be achieved with conventional light curtain schemes, and/or can cover a space of a give size more effectively (e.g., with an increased number of beams).

FIG. 9 illustrates a methodology 900 for increasing coverage of a monitored area using a single emitter-receiver pair to generate multiple monitoring light beams, in accordance with various aspects. According to the method, at 902, light can be emitted from a light source for parsing into multiple light beams. An LCD can be positioned directly in front of the light source, and transmissive apertures can be generated thereon, at 904, to permit light to pass through the LCD as desired, to form the multiple light beams. The transmissive apertures can be generated as a series of slits through which emitted light is permitted to pass. As light passes through the slits, it can be diffracted to generate a light beam that can traverse the monitored space to an opposite side (e.g., a receiver side). Generation of the transmissive apertures can be achieved by darkening the entire LCD so that it is opaque while leaving the LCD transparent at lines corresponding to the desired slits that form the transmissive apertures. In this manner, the transmissive apertures can be selectively generated, as desired, and as required by a number of light beams desired for a particular application. This aspect provides scalability in that a system employing method 900 can be utilized to generate two light beams, 10 light beams, 50 light beams, or any other desired or suitable number of light beams for transmission across a monitored area.

Once the beams have been generated and directed by passage through the transmissive apertures of the LCD, they can traverse the monitored space to a designated receiver-side mirror, which can also be a MEMS mirror, or can be a fixed mirror, depending on a particular application, design rules, etc. The receiver-side mirror can reflect its incident beam back across the monitored space to respective emitter-side mirrors along unique and mirror-pair-specific paths, A through A+n. For instance, if a first beam is directed from the emitter-side LCD to a receiver-side mirror "A," which in turn reflects the beam to an emitter-side mirror "A," then the beam has traveled along path A, as detailed above with regard to preceding figures.

When a beam is incident to its corresponding emitter-side mirror, it can be reflected back to the receiver side of the monitored area. Specifically, at 908, the beams A through A+n can be reflected back across the monitored area to a receiver-side transmissive LCD array, whereon transmissive apertures can be generated to permit the beams to pass and to diffract the beams for detection by a receiver. The receiver can then detect the aggregate light from all beams that have traversed the monitored area in order to permit a determination of whether the monitored space is free of obstructions or whether an alarm condition exists, such as an obstruction in the monitored space, that warrants an emergency shut-down of a machine for which the light curtain is employed. In this manner, a single emitter-receiver pair can be utilized to generate a plurality of light beams to monitor a given space.

Figure 10:
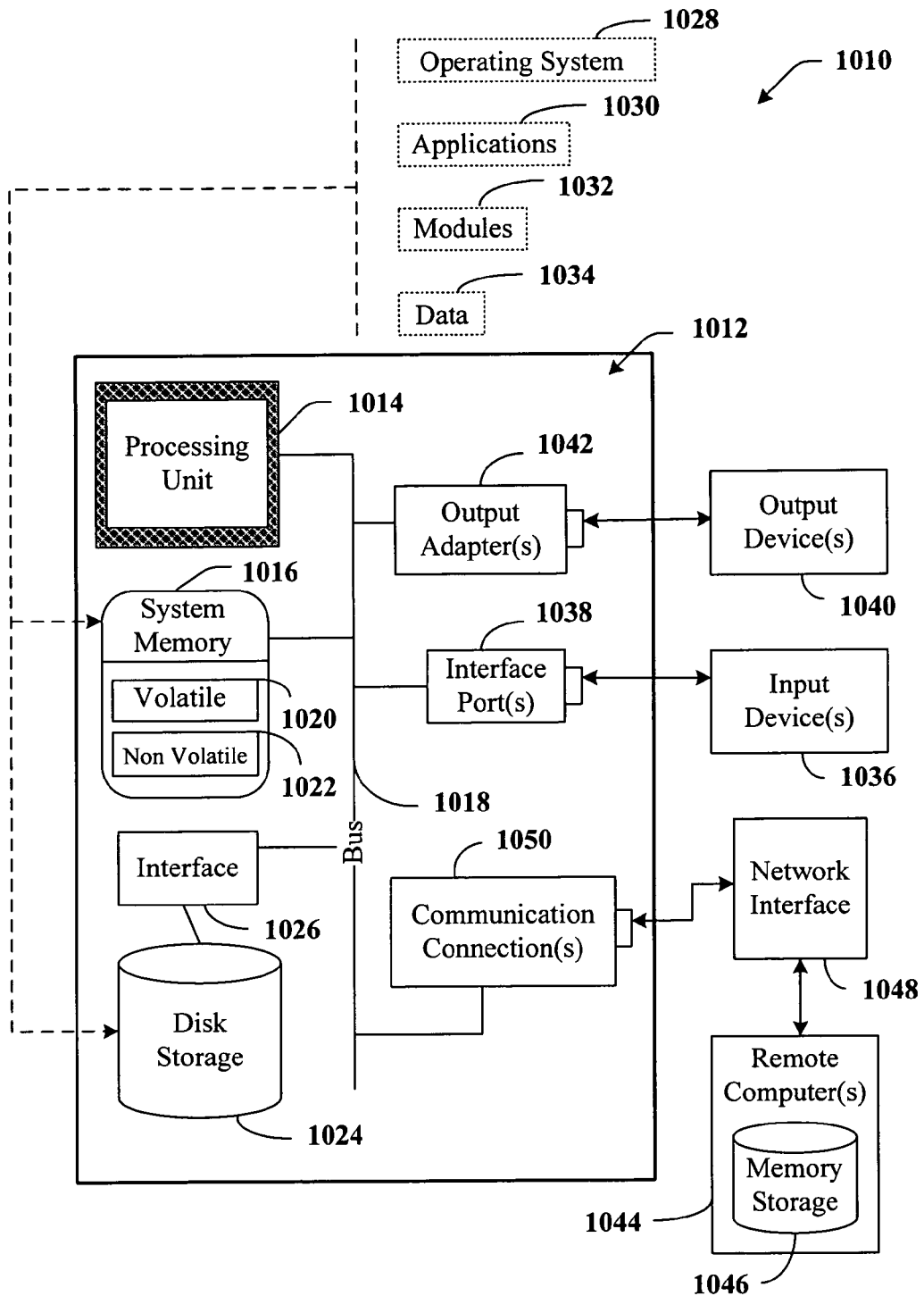
FIG. 10 is an exemplary computing environment that can be utilized in connection with the claimed subject matter.

With reference to FIG. 10, an exemplary environment 1010 for implementing various aspects of the claimed subject matter, including controlling operation of a machine and analyzing optical signals, includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates increasing coverage for a single emitter-receiver pair in a light curtain, comprising:
   an emitter that emits light that is directed to a first plurality of mirrors on an opposite side of a monitored area;
   a first transmissive LCD array positioned in front of the emitter, which has selectively generated transmissive apertures, comprising of a darkening component to darken the LCD array except at points corresponding to the transmissive apertures, thereon that permit emitted light to pass through the first LCD and deflect the emitted light into a plurality of light beams;
   a second plurality of mirrors on the emitter side of the monitored area, each of which receives a light beam reflected by a corresponding one of the first plurality of mirrors; and
   a receiver that detects light reflected by the plurality of mirrors on the emitter side of the monitored area to permit a determination of whether an object is present in the monitored area.

2. The system of claim 1, further comprising a first rotatable MEMS mirror that reflects the emitted light directionally to generate a plurality of light beams, each of which is reflected from the MEMS mirror to a respective one of the first plurality of mirrors.

3. The system of claim 2, further comprising a second rotatable MEMS mirror that receives the plurality of light beams from the second plurality of mirrors and reflects the light beams to the receiver.

4. The system of claim 1, wherein at least one of the first plurality of mirrors receives a light beam and reflects the light beam to a corresponding one of the second plurality of mirrors.

5. The system of claim 4, wherein the corresponding one of the second plurality of mirrors reflects the light beam to a second transmissive LCD array that has selectively generated transmissive apertures, comprising a darkening component to darken the LCD array except at points corresponding to the transmissive apertures, thereon to permit the light beam to pass and to deflect the light beam.

6. They system of claim 5, wherein the receiver receives the diffracted light beam after passing through the second transmissive LCD array.

7. The system of claim 1, wherein the first and second pluralities of mirrors are fixed mirrors.

8. The system of claim 1, wherein the first and second pluralities of mirrors are MEMS mirrors.

9. The system of claim 1, wherein the first and second pluralities of mirrors comprise at least one fixed mirror and at least one MEMS mirror.

10. The system of claim 1, wherein the emitted light is infrared light.

11. The system of claim 1, wherein the light beams reflected from the first plurality of mirrors are parallel to each other.

12. A method of generating multiple light beams for monitoring a space with a single emitter-receiver pair, comprising:
    emitting light from a light source on a first side of a monitored area;
    employing a first transmissive LCD array and selectively forming transmissive apertures, comprising a darkening component to darken the LCD array except at points corresponding to the transmissive apertures, thereon to generate the plurality of light beams;
    transmitting the plurality of light beams to respective mirrors on an opposite side of the monitored area;
    reflecting the plurality of light beams back to corresponding mirrors on the first side of the monitored area; and
    reflecting the plurality of light beams to a receiver on the opposite side of the monitored area.

13. The method of claim 12, further comprising employing a first rotatable MEMS mirror to generate the plurality of light beams from the emitted light.

14. The method of claim 13, further comprising employing a second rotatable MEMS mirror to receive the reflected plurality of light beams and respectively reflect the light beams to the receiver.

15. The method of claim 12, further comprising employing a second transmissive LCD array and selectively forming transmissive apertures, comprising a darkening component to darken the LCD array except at points corresponding to the transmissive apertures, thereon deflect incident light beams with different angles of incidence for detection by the receiver.

16. The method of claim 12, further comprising comparing an amount of received light to a predetermined threshold value to determine whether an object is present in the monitored area.

17. A system that facilitates increasing coverage of a single emitter-receiver pair in a light curtain, comprising:
   means for emitting light;
   means for darkening of a transmissive LCD array except at points corresponding to the transmissive apertures, wherein the transmissive LCD array divides the emitted light into a plurality of light beams that are transmitted across a monitored area;
   means for reflecting the plurality of light beams back across the monitored area in a parallel orientation;
   means for reflecting the parallel light beams across the monitored area at least a second time;
   means for reflecting light beams at a means for receiving; and means for detecting light beams at the means for receiving.

* * * * *